Patented May 5, 1936

2,039,432

UNITED STATES PATENT OFFICE 2,039,432

METHOD FOR MAKING SULPHATES OF BARIUM AND CALCIUM

Jean McCallum, Ferguson, Mo., assignor to Titanium Pigment Company, Inc., New York, N. Y., a corporation of Maine No Drawing. Application September 27, 1934, Serial No. 745,697

24 Claims. (Cl. 23—122)

My invention relates to improved methods for the manufacture of pigments, particularly to the preparation of pure, white, finely-divided barium sulphate and calcium sulphate by improved methods.

One object of my invention is an economical, efficient and practical method for removing undesirable impurities present in naturally occurring forms of barium sulphate and also of calcium sulphate, such as barytes and gypsum or anhydrite.

Another object of my invention is the preparation of barium sulphate or calcium sulphate of such purity, particle size and color, that it is admirably suited for use in white surface coatings, paper manufacture, and for all purposes where such sulphates are desired. These and other objects of my invention are accomplished by the novel and improved methods hereinafter set forth.

It has long been known that barytes and mineral forms of calcium sulphate will dissolve in molten chlorides, sulphates and other salts, and numerous patented processes based on this solubility have been issued. It has been suggested, for example, to melt barytes in sodium chloride in the presence of alkali nitrates and carbonates to facilitate slagging of the impurities, by rendering them more fusible and subsequently pouring the barium sulphate—sodium chloride melt, from which the impurities have settled, into cold water.

It has been also suggested to further purify a melt of barium sulphate in sodium chloride by blowing a stream of air into the melt to which has been added a substance such as calcium oxide. By reason of certain inherent limitations of these and other prior processes, they have been more or less unsuccessful.

In dissolving barytes in sodium chloride, for example, the insoluble impurities, being in a very finely-divided form, and having a specific gravity approaching that of the melt, the settling action is slow and complete separation is never possible. I have observed that these impurities collect in more or less consolidated strata in the bottom of the furnace or other heating receptacle, and remain in a suspended condition without coalescing or combining. It is therefore virtually impossible to obtain a blanc fixe of the desired purity, and the product will always possess an objectionable tint which in intensity and hue will depend upon the kind and amount of impurities present.

My present invention differs from the prior processes in many respects. For example, by the use of novel fluxes, with or without the assistance of a reducing agent, and also the employment of the novel procedure herein described, the impurities readily settled in a coagulated condition and are easily and completely removed. The product obtained is pure, white blanc fixe, in a finely-divided form, highly valuable for many purposes.

I have discovered that it is also possible to take crude barytes or anhydrite properly crushed and pulverized, and dissolve it in molten chlorides or other molten salts; to collect all of the injurious foreign substances into a fluid slag of low melting point and having a specific gravity sufficiently higher than the melt, so that complete separation of melt and slagged impurities is possible.

In the appended claims such molten chlorides or other molten salts are generically designated by the term "a solvent salt of an element selected from the group consisting of alkali and alkaline-earth metals", which embraces sodium chloride, calcium chloride or sodium sulphate as the preferred salt.

I have also found that in general practice better control and more efficient operation are secured through the use of a reducing agent. The function of the reducing agent is two-fold and the quantity used is more or less a critical amount.

The first function of the reducing agent is to convert the iron of the charge into the ferrous state, so that it may more quickly enter and form an easily fusible slag. A second purpose of the reducing agent is to reduce a certain definite amount of barium sulphate to sulphide. This sulphide is oxidized largely to the oxide and then enters the slag. In so doing, it affects favorably the melting point of the slag and increases its specific gravity—both factors being very important in making a clean and perfect separation of slag and melt.

I have further discovered that the type of reducing agent is more or less immaterial, so long as the proper amount of reduction is secured. Other things being equal, a high-grade petroleum coke is desirable, due to its low ash content; but coke braize, anthracite slack, and the like, may also be successfully used. It is even possible to use the furnace flame as a reducing agent during this stage of the cycle, but in general, this is not so satisfactory because the flame is not subject to as definite control as a weighed quantity of reducing agent.

I have also discovered that with the ordinary type of barytes, it is necessary to add additional fluxes to form a suitable slag, viz.; one of proper melting point and of proper fluidity. Depending on the impurities present, it may be necessary to add iron or siliceous material as fluxes, with or without addition of an acid flux, for example, silica or alumina, or a basic flux, for example, lime, soda, baryta, etc. It may also be advisable to add such control fluxes as $CaF_2$, or similar materials, still further to increase the fluidity of the slag at certain stages of the work.

I have also discovered that after the charge is in molten condition, it is particularly advantageous to provide a slowly moving surface, coated with molten slag, which passes through the melt and acts as a collector for the impurities still in suspension in the melt. This beneficial result is most efficiently accomplished by using a rotating kiln type of furnace, the walls of which become coated with the molten and sticky slag. As the slag-coated bricks pass under and through the bath of melt, the slagged particles and unslagged particles of foreign matter, flux, and BaO, settle against and into this film and become a part of it.

The action of the slag-coated revolving furnace walls is very important in my improved methods, as it accelerates to a considerable amount, the consolidation of the impurities and their collection into a homogeneous high-gravity slag below the clarified melt which superimposes it.

I have also discovered that it is possible to so control the charge and operation, that the slag formed from the fluxes and foreign matter is fluid at relatively low temperatures, and such slag thereby operates as a collector of foreign matter during the first stages of my methods. It is also possible so to control the nature of the slag that during the tapping period, at a somewhat lower temperature, the slag becomes viscous.

It may thus be controlled so that while tapping off the melt in a very fluid state, the slag may be so viscous that it is practically "frozen" to the furnace walls.

Under these conditions, the melt may be completely tapped and separated from the slagged impurities, and a perfect separation secured. If operating as a batch process, the kiln temperature may be so regulated as to "freeze out" the slag during the tapping period, after which operation, the temperature is again raised and the slag melted, either for the purpose of discharge or for repeated service as a collector for impurities in a new charge.

In case the operation of the furnace is continuous, the same principle of "freezing out" the slag may be utilized. This is accomplished by maintaining "slag freezing" temperatures in the "settler" portion of the system during the period when the slag is accumulating. When slag accumulation has reached the maximum point, the temperature is raised and the slag is discharged as a fluid.

The above specific operation applies only to certain specified installations. In others, no "freezing out" is required—the molten slag being tapped from the lighter melt without having passed through a viscous or solid phase.

The operation of my improved methods in a preferred application for making pure white and finely-divided barium sulphate is as follows:

*Example A.*—I may use, for example, a crude barytes having approximately the following composition:

| | Per cent |
|---|---|
| $BaSO_4$ | 94.66 |
| $SiO_2$ | 2.30 |
| $Fe_2O_3$ | 1.94 |
| $Al_2O_3$ | 0.12 |
| $CaSO_4$ | 0.77 |
| MgO | 0.30 |

This crude barytes is crushed and pulverized to a fineness around −20 mesh. It is then mixed with approximately its own weight of sodium chloride. The reducing agent, (petroleum coke), and the iron flux, (roasted pyrite cinder), crushed to the same degree of fineness, are then added. A typical charge will have approximately the following composition:

| | Pounds |
|---|---|
| Barytes | 6000 |
| Sodium chloride | 6000 |
| Petroleum coke | 30 |
| Roasted pyrite cinder | 200 |

The mixture is then charged into a furnace, preferably the rotary kiln type, and heat is applied directly on the charge as rapidly as mechanical limitations will permit. It is important when a reducing agent is employed that an oxidizing flame be used throughout. When no reducing agent is used a reducing flame may be used during the slag forming period.

As the temperature approaches 825° C., the salt begins to melt and to exert a dissolving action upon the barium sulphate and, as higher temperatures are attained, slagging action takes place. This slagging requires from four to six hours at temperatures of 1050°–1150° C. The lining of the kiln becomes coated with the sticky fluid slag which picks up uncombined particles of foreign matter and slag, thereby clarifying the melt rapidly and completely.

As the charge melts, the reducing agent becomes active and the iron present is reduced to the ferrous state, in which form it readily enters the slag. Depending upon the amount of reducing agent present, a quantity of barium sulphate is reduced to sulphide. As the temperature rises, this sulphide enters the melt, but as rotation of the furnace continues and the temperature rises still further, the sulphide is converted to oxide and sulphate—the former entering the slag, imparting to it a higher gravity, lower melting point and greater fluidity.

These factors are all of the utmost practical importance in the commercial operation of my methods.

The amount of barium which enters the slag is negligible when compared to the gain made by improving the desirable properties of the slag. All of the barytes is taken into solution, so that the only losses are those of mechanical handling of materials and that which enters the slag as BaO. Due to the relatively low amount of impurities in crude barytes, the slag fall will amount to not more than 10% of the weight of original barytes. The slag may carry as much as 35% BaO. A net recovery of 92% $BaSO_4$ may easily be obtained as finished blanc fixe of high purity.

After complete slagging of impurities and clarification which usually requires about 2 to 3 hours during which the temperature is maintained at about 850° C., the melt is tapped at the proper rate into a fluid or quenching solution, preferably water. The fineness and, to a certain extent, the crystalline structure of the blanc fixe will depend largely upon the rate of flow of the melt into the quenching medium. For example, if I desired an extremely fine product, I regulate the flow of the melt into the quenching medium in a fairly thin stream and also provide means for dissipating the heat generated, as by cooling coils or the like. Thus the rate of quenching, concentration of brine, temperature of the quenching medium and blanc fixe concentration are controlled to give the optimum properties to the blanc fixe. After settling, washing and filtering, the blanc fixe is ready for processing, or may be dried and sold as such.

It is to be understood, of course, that I do not limit my invention to the conditions of the Example A just given. For example, in place of sodium chloride, calcium chloride, or sodium sulphate may advantageously be used. In place of roasted iron pyrites, I may substitute "iron cinder" from rolling mills, iron oxide ore, calcined iron sulphate and add also basic or acid fluxes or control fluxes, such as calcium fluoride, to further increase the fluidity of the melt.

Furthermore, according to the procedures of Example A, a crude naturally occurring calcium sulphate such as gypsum or anhydrite may be substituted for the barytes in the initial charge in substantially the same proportions as set forth in Example A without necessitating any change in the conditions of operation with the result that pure white and finely divided calcium sulphate is obtained of substantially the same high purity as the blanc fixe of Example A.

From the foregoing, it will be particularly noted that I have attained practical advantages in the preparation of pure, white, finely-divided sulphates of barium and calcium by novel methods that are both economical and efficient for industrial practices.

I claim as my invention:

1. A method for making pure, white and finely-divided sulphates of barium and calcium, which comprises melting a mixture of crude sulphate, a solvent salt of an element selected from the group consisting of alkali and alkaline-earth metals and a reducing agent, while maintaining the molten mass at temperatures to produce a free-flowing, low-melting slag containing the impurities of the crude sulphate and having a specific gravity higher than the purified sulphate melt, and separating the purified sulphate melt from the slag.

2. A method for making pure, white and finely-divided sulphates of barium and calcium, which comprises melting a mixture of crude sulphate, a solvent salt of an element selected from the group consisting of alkali and alkaline-earth metals, an iron compound, and a reducing agent, while maintaining the molten mass at temperatures to produce a free-flowing, low-melting slag containing the impurities of the crude sulphate and having a specific gravity higher than the purified sulphate melt, and separating the purified sulphate melt from the slag.

3. A method for making pure, white and finely-divided sulphates of barium and calcium, which comprises melting a mixture of crude sulphate, an alkali-metal chloride and a reducing agent, while maintaining the molten mass at temperatures to produce a free-flowing, low-melting slag containing the impurities of the crude sulphate and having a specific gravity higher than the purified sulphate melt, and separating the purified sulphate melt from the slag.

4. A method for making pure, white and finely-divided sulphates of barium and calcium, which comprises melting a mixture of crude sulphate, sodium chloride and a reducing agent, while maintaining the molten mass at temperatures to produce a free-flowing, low-melting slag containing the impurities of the crude sulphate and having a specific gravity higher than the purified sulphate melt, and separating the purified sulphate melt from the slag.

5. A method for making pure, white and finely-divided sulphates of barium and calcium, which comprises melting a mixture of crude sulphate, a solvent salt of an element selected from the group consisting of alkali and alkaline-earth metals, roasted iron pyrite, and a carbonaceous material, while maintaining the molten mass at temperatures between 1000 and 1200° C. to produce a free-flowing, low-melting slag containing the impurities of the crude sulphate and having a specific gravity higher than the purified sulphate melt, and separating the purified sulphate melt from the slag.

6. A method for making pure, white and finely-divided sulphates of barium and calcium, which comprises melting a mixture of crude sulphate, sodium chloride, roasted iron pyrite, and a carbonaceous material, while maintaining the molten mass at temperatures to produce a free-flowing, low-melting slag containing the impurities of the crude sulphate and having a specific gravity higher than the purified sulphate melt, and separating the purified sulphate melt from the slag.

7. A method for making pure, white and finely-divided sulphates of barium and calcium, which comprises melting a mixture of crude sulphate, a solvent salt of an element selected from the group consisting of alkali and alkaline-earth metals and a reducing agent, while maintaining the molten mass at temperatures to produce a free-flowing, low-melting slag containing the impurities of the crude sulphate and having a specific gravity higher than the purified sulphate melt, separating the purified sulphate melt from the slag, and discharging said purified sulphate melt into a quenching medium.

8. A method for making pure, white and finely-divided sulphates of barium and calcium which comprises melting a mixture of crude sulphate, a solvent salt of an element selected from the group consisting of alkali and alkaline-earth metals, a reducing agent and a basic flux, while maintaining the molten mass at temperatures to produce a free-flowing, low-melting slag containing the impurities of the crude sulphate and having a specific gravity higher than the purified sulphate melt, and separating the purified sulphate melt from the slag.

9. A method for making pure, white and finely-divided sulphates of barium and calcium which comprises melting a mixture of crude sulphate, a solvent salt of an element selected from the group consisting of alkali and alkaline-earth metals, an iron compound, a reducing agent and an acid flux, while maintaining the molten mass at temperatures to produce a free-flowing, low-melting slag containing the impurities of the crude sulphate and having a specific gravity higher than the purified sulphate melt, separating the purified sulphate melt from the slag, and discharging said purified sulphate into a quenching medium.

10. A method for making pure, white and finely-divided sulphates of barium and calcium which comprises melting a mixture of crude sulphate, sodium chloride, roasted iron pyrite, a carbonaceous material, and silica, while maintaining the molten mass between 1000° and 1200° C. to produce a free-flowing, low-melting slag containing the impurities of the crude sulphate and having a specific gravity higher than the purified sulphate melt, and separating the purified sulphate melt from the slag melt.

11. In a method for making pure, white and finely-divided sulphates of barium and calcium, the step which consists in maintaining a molten mixture of crude sulphate, a solvent salt of an element selected from the group consisting of alkali and alkaline-earth metals, an iron compound, and a reducing agent at temperatures to reduce the iron to ferrous condition and a part of the crude sulphate to sulphide, the latter changing into the oxide at the temperature of the melt, to form a slag containing ferrous iron, said oxide and the impurities of the crude sulphate that is heavier than the molten sulphate, said slag being readily separable from the purified sulphate melt.

12. In a method for making pure, white and finely-divided sulphates of barium and calcium, the step which consists in maintaining a molten mixture of crude sulphate, sodium chloride, roasted iron pyrite, and a carbonaceous material at temperatures between 1000 and 1200° C. to reduce the iron to ferrous condition and a part of the crude sulphate to sulphide, the latter changing into the oxide at the temperature of the melt, to form a slag containing ferrous iron, said oxide and the impurities of the crude sulphate that is heavier than the molten sulphate, said slag being readily separable from the purified sulphate melt.

13. In a method for making pure, white and finely-divided sulphates of barium and calcium, the step which consists in maintaining a molten mixture of crude sulphate, sodium chloride, roasted iron pyrite, a carbonaceous material, and an acid flux at temperatures between 1000 and 1200° C. to reduce the iron to ferrous condition and a part of the crude sulphate to sulphide, the latter changing into the oxide at the temperature of the melt, to form a slag containing ferrous iron, said oxide and the impurities of the crude sulphate that is heavier than the molten sulphate, said slag being readily separable from the purified sulphate melt.

14. In a method for making pure, white and finely-divided sulphates of barium and calcium from crude sulphate fused with a salt of an element selected from the group consisting of alkali and alkaline-earth metals, the step which consists in combining the impurities therein in a free-flowing slag by maintaining the molten mass between 1000 and 1200° C. in the presence of a reducing agent and an iron compound, said slag being heavier than the therefrom separable purified sulphate melt.

15. In a method for making pure, white and finely-divided sulphates of barium and calcium from crude sulphate fused with a salt of an element selected from the group consisting of alkali and alkaline-earth metals, the step which consists in combining the impurities therein in a free-flowing slag by maintaining the molten mass between 1000 and 1200° C. under reducing conditions, said slag being heavier than the therefrom separable purified sulphate melt.

16. In a method for making pure, white and finely-divided sulphates of barium and calcium from crude sulphate fused with a salt of an element selected from the group consisting of alkali and alkaline-earth metals, the step which consists in combining the impurities therein in a free-flowing slag by maintaining the molten mass between 1000 and 1200° C. in the presence of a carbonaceous material, roasted iron pyrite and an acid flux, said slag being heavier than the therefrom separable purified sulphate melt.

17. In a method for making pure, white and finely-divided sulphates of barium and calcium from crude sulphate fused with a halogen salt of an alkali or alkaline-earth metal, the step which consists in combining the impurities therein in a free-flowing slag by maintaining the molten mass between 1000 and 1200° C. under reducing conditions, said slag being heavier than the therefrom separable purified sulphate melt.

18. In a method for making pure, white and finely-divided sulphates of barium and calcium from crude sulphate fused with a molten chloride of an alkali-metal, the step which consists in combining the impurities therein in a free-flowing slag by maintaining the molten mass between 1000 and 1200° C. under reducing conditions, said slag being heavier than the therefrom separable purified sulphate melt.

19. In a method of making pure, white and finely-divided sulphates of barium and calcium from crude sulphate fused with molten chlorides of an alkali-metal, the steps which comprise maintaining the molten mass at a temperature above the melting point thereof in the presence of a reducing agent to form a free-flowing slag containing the impurities therein, and then separating said impurities-containing slag from the purified sulphate by passing through the molten mass a surface upon which said slag will adhere.

20. In a method of making pure, white and finely-divided sulphates of barium and calcium from crude sulphate fused with molten chlorides of an alkali-metal, the steps which comprise maintaining the molten mass at a temperature between 1000° and 1200° C. in the presence of a reducing agent to form a free-flowing slag containing the impurities therein, and then separating said impurities-containing slag from the purified sulphate by passing through the molten mass a surface upon which said slag will adhere.

21. In a method for making pure, white and finely-divided sulphates of barium and calcium from a mixture of crude sulphate, a halogen salt of an alkali or alkaline-earth metal, and a reducing agent maintained at a temperature between 1000° and 1200° C. within a reaction vessel, the step which consists in manipulating the reaction vessel to separate the heavier impurities-containing slag from the purified sulphate melt through adherence of said slag to said reaction vessel.

22. In a method for making pure, white and finely-divided sulphates of barium and calcium from crude sulphate fused with a salt of an element selected from the group consisting of alkali and alkaline-earth metals, the step which consists in maintaining the molten mass at a temperature above the melting point thereof under reducing conditions until a fluid slag containing the impurities of the mass separates from the thereby purified sulphate melt.

23. In a method for making pure, white and finely-divided sulphates of barium and calcium from crude sulphate fused with a salt of an element selected from the group consisting of alkali and alkaline-earth metals, the step which consists in maintaining the molten mass at a temperature between 1000° and 1200° C. under reducing conditions until a fluid slag containing the impurities of the mass separates from the thereby purified sulphate melt.

24. A method for making pure, white and finely-divided sulphates of barium and calcium, which comprises melting a mixture of crude sulphate, a solvent salt of an element selected from the group consisting of alkali and alkaline-earth metals, a flux, and a reducing agent, while maintaining the molten mass at temperatures to produce a free-flowing, low-melting slag containing the impurities of the crude sulphate and having a specific gravity higher than the purified sulphate melt, and separating the purified sulphate melt from the slag.

JEAN McCALLUM.